United States Patent
Semenov

(10) Patent No.: US 11,138,174 B2
(45) Date of Patent: Oct. 5, 2021

(54) ELECTRONIC DATABASE AND METHOD FOR FORMING SAME

(71) Applicant: Aleksej Petrovich Semenov, Moscow obl. (RU)

(72) Inventor: Aleksej Petrovich Semenov, Moscow obl. (RU)

(73) Assignee: Aleksej Petrovich Semenov, Moscow (RU)

( * ) Notice: Subject to any disclaimer, the term of this patent is extended or adjusted under 35 U.S.C. 154(b) by 99 days.

(21) Appl. No.: 16/489,623

(22) PCT Filed: Mar. 14, 2018

(86) PCT No.: PCT/RU2018/000157
§ 371 (c)(1),
(2) Date: Aug. 28, 2019

(87) PCT Pub. No.: WO2018/174749
PCT Pub. Date: Sep. 27, 2018

(65) Prior Publication Data
US 2019/0370242 A1 Dec. 5, 2019

(30) Foreign Application Priority Data
Mar. 20, 2017 (RU) .............................. 2017109115

(51) Int. Cl.
*G06F 16/22* (2019.01)

(52) U.S. Cl.
CPC ........ *G06F 16/2282* (2019.01); *G06F 16/221* (2019.01); *G06F 16/2272* (2019.01)

(58) Field of Classification Search
CPC ........ G06F 16/284; G06F 16/86; G06F 16/21; G06F 16/2282

USPC .......................................................... 707/792
See application file for complete search history.

(56) References Cited

U.S. PATENT DOCUMENTS

| 5,369,761 A | 11/1994 | Conley et al. |
| 5,442,784 A | 8/1995 | Powers et al. |
| 6,163,775 A | 12/2000 | Wlaschin et al. |

(Continued)

FOREIGN PATENT DOCUMENTS

RU    2364921 C2    8/2009

OTHER PUBLICATIONS

International Search Report dated Sep. 13, 2018 in respect of the International Patent Application PCT/RU2018/000157.

*Primary Examiner* — Hung T Vy
(74) *Attorney, Agent, or Firm* — BCF LLP

(57) ABSTRACT

Methods and systems for generating an electronic database, the electronic database comprising database elements being organized in a single table, the single table comprising at least four columns, the at least four columns including: a first column for storing identification numbers of the database elements, a second column for storing a numbers of a parent element for database elements being dependent from other database elements, a third column for storing database elements values, a fourth column for storing a code of the in-use datatypes; and at least five rows, the at least five rows including a first row representing a root element, a second row representing a datatype, a third representing a term, a fourth row representing the term's attribute and a fifth row representing data.

3 Claims, 3 Drawing Sheets

(56) References Cited

U.S. PATENT DOCUMENTS 6,505,205 B1 1/2003 Kothuri et al.
2003/0065659 A1* 4/2003 Agarwal ................. G06F 16/86

* cited by examiner

FIG. 4

ELECTRONIC DATABASE AND METHOD FOR FORMING SAME

FIELD

The present technology relates to data processing and more precisely to an electronic database and a method of generating an electronic database.

BACKGROUND

U.S. Pat. No. 5,369,761 teaches a system that may be used to enable a database administrator to selectively denormalize a database transparently to users and programmers. The system keeps a record of the mapping between the denormalized fields and the base fields from which they are derived. Processors access those recorded links to keep the database self-consistent and to retrieve data from denormalized fields whenever possible.

SUMMARY

Embodiments of the present technology have been developed based on developers' appreciation of at least one technical problem associated with the prior art solutions.

The present technology arises from an observation made by the developer(s) that prior art solutions do not always provide flexibility and are subject to unstable functioning due to the direct involvement of the user in building the database structure.

The present technology arises from an observation made by the developer(s) that prior art solutions may require the manual setup of correspondence fields between a normalized and a denormalized table, and providing usability of data manual selection at the cost of additional charges for duplicate information storing. This is one of the solutions from one of the fragments of an information system, and this solution does not form a complete system. Furthermore, this solution does not allow working with large quantities of data without additional actions on the architecture of the database: further normalization, creation of indexes and data parts (segments or partitions).

The present technology arises from an observation made by the developer(s) that a technical problem solved by embodiments of the present technology originates from the necessity of generating a cross-functional database.

The technical result associated with embodiments of the present technology is to improve the reliability of the database reliability by eliminating errors when adding new data and generating queries and reports, as well as reducing the risk of avalanche-type degradation of performance due to the lack of necessary indexes when working with large quantities of data (tens and hundred millions of records).

In accordance with a first broad aspect of the present technology, there is provided an electronic database, the electronic database comprising database elements being organized as a single table, the single table comprising at least four columns, the at least four columns including: a first column for storing identification numbers of the database elements, a second column for storing a numbers of a parent element for database elements being dependent from other database elements, a third column for storing database elements values, a fourth column for storing a cods of the in-use datatypes; and at least five rows, the at least five rows including a first row representing a root element, a second row representing a datatype, a third representing a term, a fourth row representing the term's attribute, a fifth row representing data.

In some implementations, the single table further comprises a fifth column, the fifth column for storing sequence numbers of elements among elements with equal dependencies.

In accordance with a second broad aspect of the present technology, there is provided a method for generating an electronic database by a database management system, the method executable by an electronic device, the method comprising the steps of: organizing, by the database management system, data in a single table of at least four columns and at least five rows, generating a first row representing a root element wherein a first column is for storing a first identification number, generating a second row representing a datatype, wherein the first column is for storing a datatype unique identification number, the datatype unique identification number being different from the first identification number, a third column is for storing an in-use datatype name and a fourth column is for storing a datatype code, generating a third row representing a term, wherein the first column is for storing a term unique identification number, the third column is for storing a term name and the fourth column is for storing an in-use datatype code, generating a fourth row representing a term attribute, wherein the first column is for storing a term attribute's unique identification number and the second column is for storing a term attribute's parent element identification number, the term attribute being dependent on the parent element, and generating a fifth row representing data, wherein the first column is for storing a data unique identification number, the second column is for storing a data parent element identification number, the data being dependent on the parent element, the third column is for storing the data and the fourth column is for storing a unique datatype code.

In some implementations, the method further comprises generating a fifth column, the fifth column for storing sequence numbers of elements among elements of equal dependency.

In embodiments of the present technology, information is stored in a single indexed table with a specified number of columns (bars). Consequently, it is not necessary to alter the structure of the database by adding or deleting new tables and relations, adding indexes. The developed and once specified system becomes universal for any user tasks and excludes external interventions thus excluding errors which can occur during inserting, altering and deletion of data, and also provides reliability and stability.

The universality (versatility) of the specified system combined with the use of a Web-interface allows hiding technical details of the database and internal algorithms of data handling from the user, as well as providing the possibility of working with a data model by using an understandable language for the user: all objects of the subject area and manipulation of them are described without using application software which also helps to improve the usability and the system reliability as well as its usability.

The specified system of electronic database creation stores all data in a single table which includes five columns. These columns allow developing any structure of data and specify all characteristics of the information unit: identifier (physical location), type, parent, value and order (among elements of this type for this parent). The first column contains the identification numbers of database elements (ID), the second column contains the identification numbers of parent elements for elements with slave dependencies of other elements (Parent ID), the third column contains the elements' values (Value), the fourth column contains the code of the record specified in the same table and is used as type of an element (Type), the fifth column contains sequence numbers of elements among the elements of equal dependencies (Order).

TABLE 1

| Appointment | Type | Description |
|---|---|---|
| ID | Integer | Uniquely identifies |
| Parent ID | Integer | ID parent element's |
| Type | Integer | ID type of element |
| Value | String | Meaning of element |
| Order | Integer | The order among equal subordination |

The fifth column (Order) is additional and serves to order the selection on the user's demand.

Here are the following indexes constructed for the table:
PRIMARY (ID)—unique index (foreign key);
Type+Value—type and value for indexed search by value;
Parent ID+Type—Parent and Type for searching of an element's properties by using of index.

It is necessary to construct another index for high loaded systems:
Type+ID—Type and ID for fast access to the specified datatype.

The indexes specified above are used to accelerate the data selection for the needs of the system: metadata collection (data which describes the structure of data); selection of samples of types with their properties and data altering in accordance with the metadata and the user's commands.

The type of element (Type) is the unique code which identifies the analogue of the Table—Field combination. The presence of the index of this field allows to do searching in limited space: it is not necessary to view the entire table, it is enough to view only the part of it related to the desired table field. FIG. 1 shows how the presence of the index (Type index) allows to store data compactly and to quickly retrieve the list of physical addresses of data in data table without the need to view the entire data table.

The definition of data, relations and dependencies are stored in the form of metadata in the same table where the data is.

Each element (data unit) captures at least one table row which consists of its identification number, parent element identification number, datatype and value. The value is stored as a set of characters by chunks of limited length, for example, of 127 characters. If the field size of the third column (Value) is not enough for storing an element's value, the rest of this value will be written to slave elements—rows numbered in order of filling a field for the fifth column (Order). Such rows have a special type (Type) that equals to 0 which is not described in metadata, but is frequently or regularly used by the system. In case of the Order field absence, the fragments of Value ordering are determined by their ID's sequencing.

Metadata is dependent on nonexistent element with ID=0, independent elements (objects) are dependent on the root element with ID=1.

Metadata describes data structure, the system creates, stores and processes data elements in accordance with this structure.

The system understands the base datatypes listed below, as well as allows to create a new base and optional datatypes which inherit base datatypes properties. The base type uses its own ID as a type. The optional type uses relation on the base type or other optional type as the type.

An example of base datatypes set is shown in Table 2.

TABLE 2

| Type | Description |
|---|---|
| SHORT | A short string (up to 127 characters) |
| CHARS | A string of unlimited length |
| MEMO | Text (different from CHARS only multiline input field) |
| DATE | Date |
| DATETIME | Date and time |
| FILE | File |
| NUMBER | Integer |
| SIGNED | The number with a decimal part |
| BUTTON | Action |
| BOOLEAN | Boolean (Yes/No) |

The base datatypes are used as metadata and identified by the field in the Value column. For the type identification, in case when this record describes the base type, the metadata's record contains in the Type field the identifier of the base type or its own type.

Due to a limited and fixed set of the base datatypes properties, these properties can be once programmed and used for processing and submission of data to the user. The set of base datatypes provides the possibility of generating any degree of complexity of various data structures.

As a datatype, it is possible to use a relation to the identifier of any existing non-basic datatype, and this will mean a correspond relation of these two datatypes. It enables to describe all kinds of interrelated datatypes of elements, and each of them will have all kinds of properties.

An example of metadata data describing in the database is listed in Table 3.

TABLE 3

| Id | Parent ID | Value (comment) | Type | Order | comment |
|---|---|---|---|---|---|
| 1 | 1 | Root | 1 | 0 | Root element, |
| 8 | 0 | CHARS | 8 | 0 | Base |
| 9 | 0 | DATE | 9 | 0 | datatypes |
| 11 | 0 | BOOLEAN | 11 | 0 | |
| 13 | 0 | NUMBER | 13 | 0 | |
| 15 | 0 | SIGNED | 15 | 0 | |
| 2 | 0 | Contract | 13 | 0 | Terms - |
| 3 | 0 | Client | 8 | 0 | arbitrary |
| 14 | 0 | (a reference to the Client: Value field is empty, and as the type of ID used term, which refers to this type of) | 3 | 0 | datatypes |
| 4 | 0 | Debit note | 13 | 0 | |
| 5 | 0 | Total | 15 | 0 | |
| 18 | 0 | Date | 9 | 0 | |
| 21 | 0 | Product | 8 | 0 | |
| 22 | 0 | Subject of a contract | 8 | 0 | |
| 23 | 0 | Price | 15 | 0 | |
| 24 | 0 | Cost price | 15 | 0 | |
| 19 | 2 | (Data field empty. This record captures the fact that the object of the "Contract" (2) have props such as "Date" (18)) | 18 | 1 | Term's property |
| 20 | 2 | (Data field is empty) | 22 | 2 | |
| 25 | 2 | (Data field is empty) | 23 | 3 | |
| 26 | 2 | (The data field is empty, the record sets props "link on the Client (14)" type in the "Contract" (2)) | 14 | 4 | |

TABLE 3-continued

| Id | Parent ID | Value (comment) | Type | Order | comment |
|---|---|---|---|---|---|
| 28 | 21 | (Data field is empty) | 23 | 5 | |
| 29 | 21 | (Data field is empty) | 24 | 6 | |
| 1181 | 1 | 1161 (Contract) | 2 | 1 | Data |
| 3561 | 1181 | 20060602 (date) | 18 | 1 | |
| 3562 | 1181 | Carrying out works . . . | 22 | 2 | |
| 3563 | 1181 | 40000 (total) | 23 | 3 | |
| 3565 | 1181 | (A reference to the Client) | 113326 | 4 | |

This method may be realized as follows.

Applying a DBMS, for example, MySQL, by using the SQL programming language, the aforesaid table is created from the root element's record in the first row.

Next, the base datatypes are selected in the second and subsequent rows by binding the unique identification number for the first column ID. The values of cells for the second column Parent ID are being set as null because the elements of types have no parents. The cells of the third column Value are being set as names of datatypes. The base datatypes of cells for the fourth column Type are being set by ID's of them—the base datatypes refer to themselves as a type. The values of cells for the fifth column Order are being set as null values because of the independence of these elements and the absence of dependence order.

The next rows describe the terms used by the user for data description. A term can define a link for another term described previously. The cells of the first column ID contain the unique identification numbers of terms. The cells of the second column Parent ID consist of null values. The cells of the third column Value contain the names of terms or null values in case this term refers??? to another term. The terms of cells for the fourth column Type consist of code types for this term—ID of the base type or ID of another term described previously in case if this term refers?? to another term. The cells of the fifth column Order contain null values.

In accordance with the terms, their properties dependent on them are described: parameters or characteristics of the terms are used by the user for describing data. The cells of the first column ID contain the unique identification numbers of properties. The cells of the second column Parent ID consist of parents' terms identification numbers. The cells of the third column Value may store additional operation information, for example, default value for this attribute, attribute of its required presence or mask for checking its validity. The cells of the fourth column Type consist of properties type—ID of the element previously described for the identification of purpose and characteristics of this term. The cells of the fifth column Order contain number values of dependence order among other equal term's properties.

Next comes the description of the data which contains semantic information for the user and which will be used for reports generated during the user's queries processing. The cells of the first column ID contain the unique identification numbers of data units. The cells of the second column Parent ID consist of the root' identification number or parent terms if present. The cells of the third column Value store data values. The cells for the fourth column Type consist of ID for data type which determines the characteristics of this specific record. The ells of the fifth column Order contain number values of dependence order in case of presence of several equal elements which are slave to another data element.

It may be understood by a person skilled in the art that the specified order for filling rows and columns is given as an example aimed at describing the present technology. The order of rows and columns may differ depending on the order of inserting, altering and deleting information from a table for each specified case.

In the context of the present specification, SQL (Structured Query Language) is a special-purpose domain-specific language used in programming and designed for managing data held in a relational database management system (RDBMS), or for stream processing in a relational data stream management system.

In the context of the present specification, MySQL is an open-source relational database management system (RDBMS).

In the context of the present specification, an interface is a shared boundary across which three separate components of a computer system exchange information.

In the context of the present specification, a database is an organized collection of data.

In the context of the present specification, a database management system (DBMS) is a computer software application that interacts with the user, other applications, and the database itself to capture and analyze data.

In the context of the present specification, an element (unit) of database—structural unit, which is the root element, data type, term, term's property or data.

In the context of the present specification, a database index is a data structure that improves the speed of data retrieval operations on a database table at the cost of additional writes and storage space to maintain the index data structure. Indexes are used to quickly locate data without having to search every row in a database table every time a database table is accessed. Indexes can be created using one or more columns of a database table, providing the basis for both rapid random lookups and efficient access of ordered records.

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and electronic devices, however it is not required to be the case with respect to the present technology. Thus, some (non-limiting) examples of electronic devices include personal computers (desktops, laptops, netbooks, etc.), smartphones, and tablets, as well as network equipment such as routers, switches, and gateways.

It should be understood, that in the present context the fact that the device functions as an electronic device does not mean that it cannot function as a server for other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 4 is an illustration of the view of the editor by the 《Types》 tab.

DETAILED DESCRIPTION OF THE DRAWINGS

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

Referring to FIGS. 1-7, terms 1, attributes 2 and data 3 are illustrated.

The DBMS and the database are stored on a server and are accessible by a user via the Internet through a Web-interface, however the system may also be used locally on the user PC.

After registration in the system by using the Internet and a browser installed on the standard PC, the user will receive an authorized profile with access to the database management. The user, its profile and its data access restrictions are described in the same database by means of the declared system.

Figure 1:
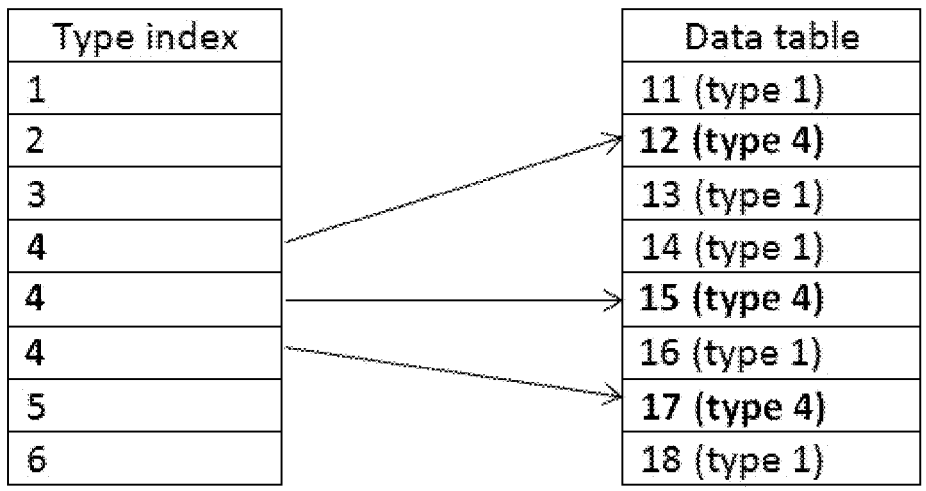
FIG. 1 is an illustration of a table representation of a type index and data table.
Figure 2:
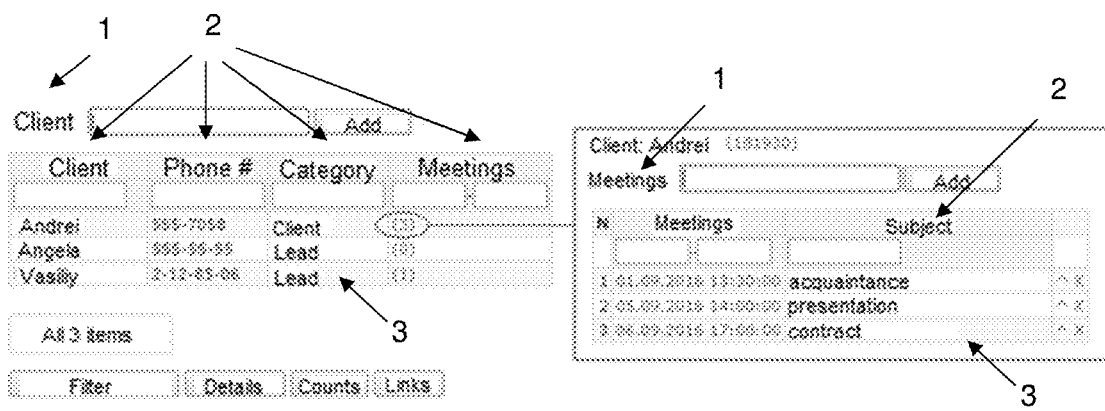
FIG. 2 is an illustration of a table representation of the 《Client》 and the 《Meeting》 data arrays.
Figure 3:
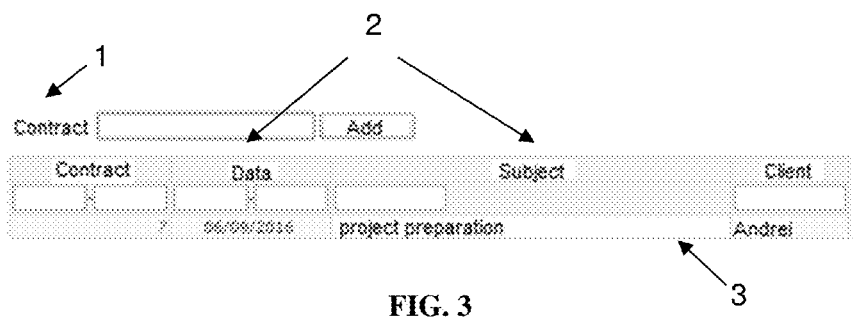
FIG. 3 is an illustration of a table representation of the 《Contract》 data array.

FIGS. 2 and 3 show the table representation of the data array filled by the user and in which the 《Client》, 《Meetings》 and 《Contract》 are the terms 1, the names 《Client》, 《Category》, 《Phone》, 《Contract》, etc. are the attributes 2 of terms 1, the cells of the table contain the data 3.

The main problem of information systems is the rising price of their maintenance in case the system complexity is increase of the complexity of the system with the development and maintenance costs rising exponentially (see FIG.

8). There are two main risk factors: imperfection of developing a program code and compromise when choosing a database architecture. The present technology allows the user to independently set the structure of data of any complexity and rules of their processing without the necessity of making tables, indexes, stored procedures and functions, as well as program code. Therefore, there is no reason to contact the most expensive developing team: analyst, leading developer, programmer/coder, tester and implementer. The system and method use the ready-made program code and architecture decision in the form of a limited set of simple units from which an information system of any complexity can be made; it also contributes to the system versatility, in which the dependence of costs for maintenance on the system complexity will be as good as linear. This advantage is provided by the specified calculations and data redundancy, because the system indexes all storage data; however, however, these costs are well below the time expenditures and material costs for developing team maintenance. The main risk is the human factor when designing and program code and database implementation, and this risk is completely excluded.

The user has all means for adding, selecting, altering and deleting data which are accessible in any sphere of the application programming. The system allows to create various templates and user interface forms, filling it by data, selected by various rules, altering data and saving it in the database, and consequently generating the interface and login of application program without resorting to programming.

In other words, the declared system and method are completed means of application of software developing.

Figure 4:
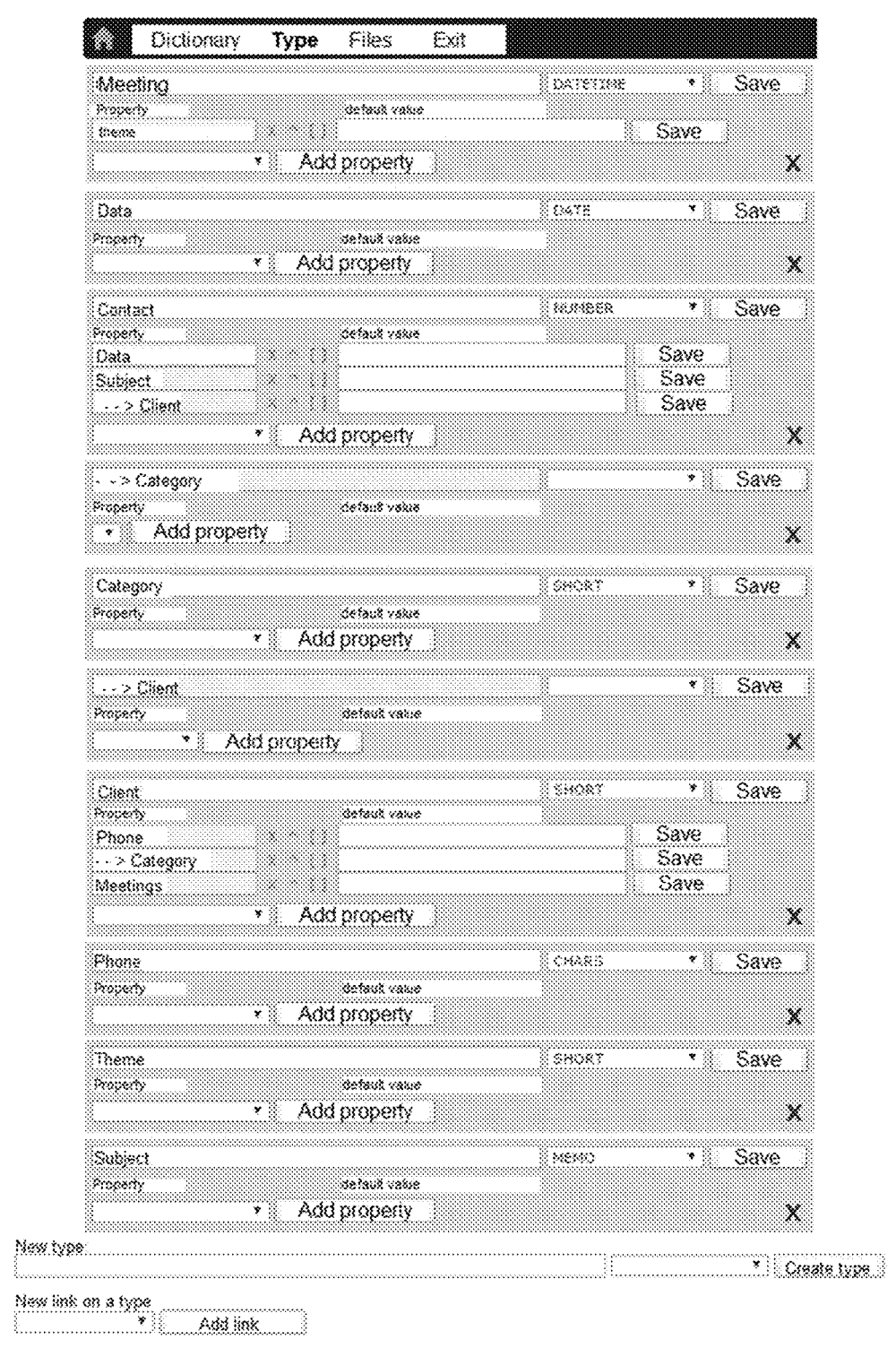

FIG. 4 shows the fields of the types reference editor which allows the user to set the datatypes and their attributes (characteristics), thus generating aspecific hierarchy of data for each specified situation on the base of the single table of the stated system. The user sees all datatypes of the system, as well as their dependencies and relations. In particular, the user sees that the «Client» type has the attributes «Phone», «Category» and «Meetings». At that, the «Category» is the reference value which is defined by the link on the record in the «Category» reference; the «Meetings» is a slave records array. The present technology allows to represent all of this to the user without expanding technical details, the user operates only by the terms of his/her own business and by two simple mnemonics: the link prefix of reference «-->» and a base datatype (DATE, CHARS, NUMBER, etc.). A competent Microsoft Excel user has enough skill for working with the types' reference asnowadays this level of competence is common among most office employees.

Figures 5, 6, 7, 8:
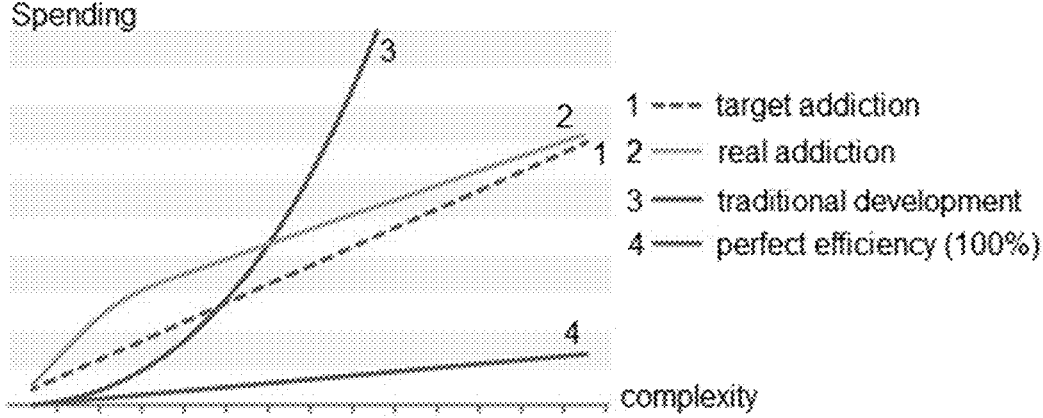
FIG. 5 is an illustration of accordance of the editor fields to the table representation fields.
FIG. 6 is an illustration of the form for the report generation.
FIG. 7 is an illustration of the view of the formed report.

FIG. 5 shows a correspondence between the editor's fields and the fields of the table representation. The types' editor allows creation the understandable to user representation of business-entities in form of tables. The user can set the order of column's sequence in the table (the sign «^» in the types' editor moves an attribute one row above) and set the attributes of type are required to fill (the note of exclamation in brackets «[!]» means that this attribute is required to fill). The structure is set in the types' editor is shown by correspond way on tables of the reference of the present technology.

FIGS. 6 and 7 show the form of report generation and its view correspondingly. The report building involves selection of various number of the report's columns from all accessible set of types. The system allows selecting linked types only, at that it is not required from the user to point out how it is wanted to link the types selected—the system will do it automatically by using the relations are specified in the types' editor by means of links and slave arrays. The reports' builder functionality allows implementation the main functions of selecting, filtering and aggregation of data which exist in the SQL language, including embedded reports. Also, it can be used the all embedded functions of the relational database of the system when reports building.

There are the next meanings of the fields for the «Columns» table of the report.

Name in report—name of a column in the output report, value of the report's Column as default.

Formula—it sets a calculated expression or pseudonym of a column. The drop-down list of the report's columns contains the «Calculated value on the last position. It is synthetical field which allows inserting various operators and functions available in the SQL language. At that, it is permissible to operate by other report's columns if they have pseudonyms in the Formula field.

If the Formula field has an expression in brackets, then the system will try finding the correspond report and using the data from it as from embedded report.

Value (from), Value (to)—the range of values (for dates and numbers) or the mask (for text). It is allow to use here the value of other report's fields, if enclosing in brackets theirs name from the Formula's column.

Function—the aggregation function is applied to the field's value: AVG (average), COUNT (count), MAX (maximum), MIN (minimum), SUM (summary) The grouping of values calculated by this function is performing by all fields in which the aggregation is not used (one of listed functions is not specified).

Function (from), Function (to)—the range of values (for dates and numbers) or the mask (for text) is applied after calculating of functions are selected in the Function's field (the HAVING key analogue in the SQL). It is allow to use here the value of other report's fields, if enclosing in brackets theirs name from the Formula's column.

Hide—if selected, then the correspond column will be not shown in the report, although its value can be used for calculations, filtering and sorting of the report.

Format—the final format for a field displaying. It serves for conversion of value to required form.

Sort.—the pointer of sequence and direction of the report sorting. The negative number will result the return sorting of the report (decreasing of values).

Total—the aggregation function is applied to the report's column values. If a function is specified at least in one column, then the report will show the total line with correspond values.

Embodiments of the present technology allow organizing an individual database for each case which will be reliable and based on a universal system in understandable form for the user.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for generating an electronic database by a database management system, the method executable by an electronic device, the method comprising the steps of:
   displaying a user interface;
   receiving, via the user interface, user input defining one or more terms;
   receiving, via the user interface, user input indicating one or more term attributes for the one or more terms;
   generating, by the database management system, a single table based on the one or more terms and the one or more term attributes, wherein the single table comprises at least four columns and at least five rows;
   generating a first row representing a root element wherein a first identification number of the root element is stored in a first column of the single table;
   generating one or more second rows, wherein each second row defines one of the one or more datatypes, wherein a datatype unique identification number of the respective datatype is stored in the first column, each datatype unique identification number being different from the first identification number, wherein an in-use datatype name of the respective datatype is stored in a third column of the single table, and wherein a datatype code of the respective datatype is stored in a fourth column of the single table;
   generating one or more third rows, wherein each third row defines one of the one or more terms, wherein a term unique identification number of the respective term is stored in the first column, wherein a term name of the respective term is stored in the third column, and wherein an in-use datatype code of the respective term is stored in the fourth column;
   generating one or more fourth rows representing the one or more term attributes, wherein the respective term attribute's unique identification number is stored in the first column, wherein the respective term attribute's parent element identification number is stored in the second column, the respective term attribute being dependent on the respective term attribute's parent element;
   generating a fifth row representing data, wherein a data unique identification number is stored in the first column, wherein a data parent element identification number is stored in the second column, the data being dependent on the parent element, wherein the data is stored in the third column, and wherein a unique datatype code is stored in the fourth column; and
   storing the single table in a memory of the electronic device.

2. The method of claim 1, further comprising generating a fifth column, the fifth column for storing sequence numbers of elements among elements of equal dependencies.

3. A system comprising:
   at least one processor, and
   memory storing a plurality of executable instructions which, when executed by the at least one processor, cause the system to:
   display a user interface;
   receive, via the user interface, user input defining one or more terms;
   receive, via the user interface, user input indicating one or more term attributes for the one or more terms;
   generate a single table based on the one or more terms and the one or more term attributes, wherein the single table comprises at least four columns and at least five rows;
   generate a first row representing a root element, wherein a first identification number of the root element is stored in a first column of the single table;
   generate one or more second rows, wherein each second row defines one of the one or more datatypes, wherein a datatype unique identification number of the respective datatype is stored in the first column, each datatype unique identification number being different from the first identification number, wherein an in-use datatype name of the respective datatype is stored in a third column of the single table, and wherein a datatype code of the respective datatype is stored in a fourth column of the single table;
   generate one or more third rows, wherein each third row defines one of the one or more terms, wherein a term unique identification number of the respective term is stored in the first column, wherein a term name of the respective term is stored in the third column, and wherein an in-use datatype code of the respective term is stored in the fourth column;
   generate one or more fourth rows representing the one or more term attributes, wherein the respective term attribute's unique identification number is stored in the first column, wherein the respective term attribute's parent element identification number is stored in the second column, the respective term attribute being dependent on the respective term attribute's parent element;
   generate a fifth row representing data, wherein a data unique identification number is stored in the first column, wherein a data parent element identification number is stored in the second column, the data being dependent on the parent element, wherein the data is stored in the third column, and wherein a unique datatype code is stored in the fourth column; and
   store the single table in the memory.

* * * * *